US012409819B2

(12) United States Patent
Lee et al.

(10) Patent No.: US 12,409,819 B2
(45) Date of Patent: Sep. 9, 2025

(54) INTEGRATED ELECTRONIC BRAKE SYSTEM AND CONTROL METHOD THEREOF

(71) Applicant: HYUNDAI MOBIS Co., Ltd., Seoul (KR)

(72) Inventors: Ju Ho Lee, Yongin-si (KR); Jae Hyun Park, Yongin-si (KR); In Soo Jeon, Yongin-si (KR); Bo Min Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 308 days.

(21) Appl. No.: 17/689,550

(22) Filed: Mar. 8, 2022

(65) Prior Publication Data

US 2022/0289156 A1 Sep. 15, 2022

(30) Foreign Application Priority Data

Mar. 12, 2021 (KR) .......................... 10-2021-0032932

(51) Int. Cl.
*B60T 8/88* (2006.01)
*B60Q 1/44* (2006.01)
(Continued)

(52) U.S. Cl.
CPC .............. *B60T 8/885* (2013.01); *B60Q 1/441* (2013.01); *B60T 8/94* (2013.01); *B60T 17/22* (2013.01);
(Continued)

(58) Field of Classification Search
CPC . B60T 8/329; B60T 8/885; B60T 8/94; B60T 8/172; B60T 13/662; B60T 7/042;
(Continued)

(56) References Cited

U.S. PATENT DOCUMENTS 6,102,492 A * 8/2000 Diehle .................. B60T 8/1766
303/113.5
2005/0165531 A1* 7/2005 Nilsson ................. B60T 8/1708
701/70
(Continued)

FOREIGN PATENT DOCUMENTS

KR 10-1417863 B1 7/2014
WO WO-2019210964 A1 * 11/2019 ............ B60T 13/662

*Primary Examiner* — Stephen Holwerda
(74) *Attorney, Agent, or Firm* — Morgan, Lewis & Bockius LLP

(57) ABSTRACT

An integrated electronic brake system includes a main control section configured in a first area to receive one or more of a value from a pedal sensor, a value from a cylinder pressure sensor, a value from a wheel speed sensor, or an EPB signal to perform EPB control and drive a main braking valve and a braking motor for the main braking of a vehicle, and to drive an additional braking valve for the additional braking, a sub-control section configured in a second area to receive one or more of the value from the pedal sensor, the value from the wheel speed sensor, or the EPB signal to perform the EPB control and drive the main braking valve and the braking motor through a bypass circuit, and a connection bus connecting the first and second areas mounted in one box to transfer signals between the main and sub-control sections.

18 Claims, 3 Drawing Sheets

(51) Int. Cl.
*B60T 8/94* (2006.01)
*B60T 17/22* (2006.01)

(52) U.S. Cl.
CPC ....... *B60T 2220/04* (2013.01); *B60T 2240/00* (2013.01); *B60T 2270/10* (2013.01); *B60T 2270/30* (2013.01); *B60T 2270/402* (2013.01); *B60T 2270/404* (2013.01); *B60T 2270/406* (2013.01); *B60T 2270/413* (2013.01); *B60T 2270/82* (2013.01); *B60T 2270/88* (2013.01)

(58) Field of Classification Search
CPC .... B60T 17/22; B60T 13/686; B60T 2270/10; B60T 2270/88; B60T 2220/04; B60T 2270/406; B60T 2270/404; B60T 2270/30; B60T 2240/00; B60T 2270/82; B60T 2270/402; B60T 2270/413; B60Q 1/441
See application file for complete search history.

(56) References Cited

U.S. PATENT DOCUMENTS

| | | | |
|---|---|---|---|
| 2005/0189816 A1* | 9/2005 | Eggert | B60W 10/04 303/9 |
| 2006/0015231 A1* | 1/2006 | Yoshimura | B60L 3/0076 701/1 |
| 2007/0187158 A1* | 8/2007 | Muta | B60K 28/16 180/197 |
| 2009/0198427 A1* | 8/2009 | Christopher Jackson | B60T 13/662 188/1.11 R |
| 2014/0129108 A1* | 5/2014 | Grieser-Schmitz | B60T 13/662 701/70 |
| 2014/0149002 A1* | 5/2014 | Barlsen | B60R 16/0234 701/36 |
| 2018/0290640 A1* | 10/2018 | Johnson | B60T 13/662 |
| 2019/0299786 A1* | 10/2019 | Nakagawa | B60L 3/00 |
| 2021/0078556 A1* | 3/2021 | Laine | B60T 13/683 |
| 2021/0339723 A1* | 11/2021 | Funai | B60T 8/96 |
| 2022/0371565 A1* | 11/2022 | Belling | B60T 8/92 |

* cited by examiner

INTEGRATED ELECTRONIC BRAKE SYSTEM AND CONTROL METHOD THEREOF

CROSS-REFERENCE TO RELATED APPLICATION

This application claims priority from and the benefit of Korean Patent Application No. 10-2021-0032932, filed on Mar. 12, 2021, which is hereby incorporated by reference for all purposes as if set forth herein.

BACKGROUND

Field

Exemplary embodiments of the present disclosure relate to an integrated electronic brake system and a control method thereof, and more particularly, to an integrated electronic brake system in which a control module thereof is configured into a main control section and a sub-control section, which are connected via an internal connection bus, in two independent areas, respectively, in a single box such that in the event of a failure of the main control section, a main braking valve and a braking motor can be controlled through the sub-control section, and a control method thereof.

Discussion of the Background

A brake system is absolutely necessary for a vehicle. This is because a vehicle that cannot be stopped cannot run. Therefore, for the safety of passengers, it cannot be too much to emphasize the stability of the brake system.

Therefore, Anti-lock Brake System (ABS) that shortens the braking distance by preventing the tires from being locked up and avoiding sudden manipulation of a steering wheel to avoid danger during the sudden braking, Electronic Stability Control (ESC) that maintains a stable vehicle posture by adjusting the vehicle's braking force and engine output in a dangerous situation where a vehicle is slipping, and Electronic Parking Brake (EPB) that is automatically locked to prevent a vehicle from being pushed backwards when the vehicle stops or starts from a hill, and is automatically released when the vehicle starts are employed, in which instead of the conventional hydraulic system, an electronic master booster is used to boost and provide the braking hydraulic pressure.

Recently, as interest in autonomous vehicles or electric vehicles increases, a brake system also requires stronger braking force and stability, and thus is used in combination of such electronically controlled brake systems.

The Background of the present disclosure is disclosed in Korean Patent Registration No. 10-1417863 (published on Jul. 9, 2014 and entitled 'Electronically Controlled Brake System')

In order to implement a brake apparatus by combining the electronically controlled brake systems as described above, there is a problem in that a large number of wires are required to operate the respective brake systems.

Further, in order to install the respective electronically controlled braking systems, mounting positions for mounting the respective systems are required, so there is a problem in securing a space in a vehicle.

On the other hand, if a failure occurs in a vehicle during driving, so the electronically controlled brake systems become inoperative, it may lead to a serious accident, so it is necessary to prepare for the inoperative state of the electronically controlled brake systems.

SUMMARY

The present disclosure has been devised to improve the above problems, and according to one aspect, an objective of the present disclosure is to provide an integrated electronic brake system in which a control module thereof is configured into a main control section and a sub-control section, which are connected via an internal connection bus, in two independent areas, respectively, in a single box such that in the event of a failure of the main control section, a main braking valve and a braking motor can be controlled through the sub-control section, and a control method thereof.

Various embodiments are directed to an integrated electronic brake system including: a main control section configured in a first area to receive any one or more of a value from a pedal sensor, a value from a cylinder pressure sensor, a value from a wheel speed sensor, or an electronic parking brake (EPB) signal, to perform EPB control, to drive a main braking valve and a braking motor for a main braking operation of a vehicle depending on manipulation of a pedal, and to drive an additional braking valve for the additional braking operation; a sub-control section configured in a second area to, when a driving signal is input, receive any one or more of the value from the pedal sensor, the value from the wheel speed sensor, or the EPB signal to perform the EPB control and drive the main braking valve and the braking motor for the main braking operation of a vehicle depending on the manipulation of the pedal through a bypass circuit; and a connection bus configured to connect the first area and the second area, mounted in one box, and to transfer transmission/reception signals between the main control section and the sub-control section.

In an embodiment, the driving signal may include any one or more of a watchdog signal, a fail signal of the main control section, or a user selection signal.

In an embodiment, the integrated electronic brake system may further include: a first connector mounted on the first area to connect the main control section and a peripheral device; and a second connector mounted on the second area to connect the sub-control section and a peripheral device.

In an embodiment, the main control section and the sub-control section may determine the validity of a pedal signal input from the main control section and a pedal signal input from the sub-control section, respectively.

In an embodiment, the main control section may include: a first pedal signal input part configured to receive a pedal stroke value from the pedal sensor; a cylinder pressure input part configured to receive a cylinder pressure value from the cylinder pressure sensor; a first wheel speed input part configured to receive a wheel speed value from the wheel speed sensor and decode the wheel speed value; an EPB signal input part configured to receive an EPB signal; an EPB driving part configured to drive a parking brake; a main braking valve driving part configured to drive the main braking valve for the main braking of a vehicle; an additional braking valve driving part configured to drive the additional braking valve for the additional braking of a vehicle; a motor driving part configured to drive the braking motor; a watchdog generating part configured to generate a watchdog signal; and a first micro control unit (MCU) configured to control the main braking valve driving part, the additional braking valve driving part, the motor driving part, and the EPB driving part depending on signals input from any one or more of the first pedal signal input part, the cylinder pressure input part, the first wheel speed input part, or the EPB signal input part.

In an embodiment, the additional braking valve may include an inlet valve and an outlet valve to control hydraulic pressure supplied to wheel cylinders for driving an anti-lock brake system (ABS) and an electronic stability control (ESC).

In an embodiment, the main control section may further include a first communication part to communicate with a peripheral control device through in-vehicle communication.

In an embodiment, the main control section may further include a first brake light switch configured to operate a brake light.

In an embodiment, the sub-control section may include: a second pedal signal input part configured to receive a pedal stroke value from the pedal sensor; a second wheel speed input part configured to receive a wheel speed value from the wheel speed sensor and decode the wheel speed value; a bypass circuit part configured to switch a control path to control the main braking valve driving part and the motor driving part of the main control section; a watchdog sensing part configured to sense a watchdog signal; and a second micro control unit (MCU) configured to control the main braking valve driving part, the motor driving part, and an EPB driving part depending on signals input from any one or more of the second pedal signal input part, the second wheel speed input part, or an EPB signal input part.

In an embodiment, the sub-control section may further include a second communication part to communicate with a peripheral control device through in-vehicle communication.

In an embodiment, the sub-control section may further include a second brake light switch configured to operate a brake light.

In an embodiment, the second MCU may have a lower performance specification than that of the first MCU of the main control section.

Various embodiments are directed to a method of controlling an integrated electronic brake system, the method including: monitoring, by a micro control unit (MCU), an input of a driving signal for driving a sub-control section; when the input of the driving signal has been checked, receiving, by the MCU, any one or more of a pedal stroke value from a second pedal signal input part, a wheel speed value from a second wheel speed input part, or an electronic parking brake (EPB) signal from an EPB signal input part; and controlling, by the MCU, a main braking valve driving part, a motor driving part, and an EPB driving part of a main control section through a bypass circuit part depending on the one or more of the pedal stroke value, the wheel speed value, or the EPB signal.

In an embodiment, the driving signal may include any one or more of a watchdog signal, a fail signal of the main control section, or a user selection signal.

In an embodiment, the method may further include: determining, by the MCU, the validity of a pedal signal input from the second pedal signal input part and a pedal signal input from a first pedal signal input part of the main control section.

In an embodiment, the step of controlling the main braking valve driving part and the motor driving part may include: performing, by the MCU, a braking control by cooperative control in connection with an in-vehicle peripheral control device through a communication part.

In an embodiment, the step of controlling the main braking valve driving part and the motor driving part may further include: operating, by the MCU, a brake light switch.

The integrated electronic brake system and the control method thereof according to an aspect of the present disclosure is provided so that the control module is configured into the main control section and the sub-control section, which are connected via the internal connection bus, in two independent areas, respectively, in the single box such that in the event of a failure of the main control section, the main braking valve and the braking motor are controlled through the sub-control section, thereby reducing the size and weight of the electronic brake system as well as improving stability in implementing a small autonomous vehicle.

DETAILED DESCRIPTION OF THE ILLUSTRATED EMBODIMENTS

Figure 1:
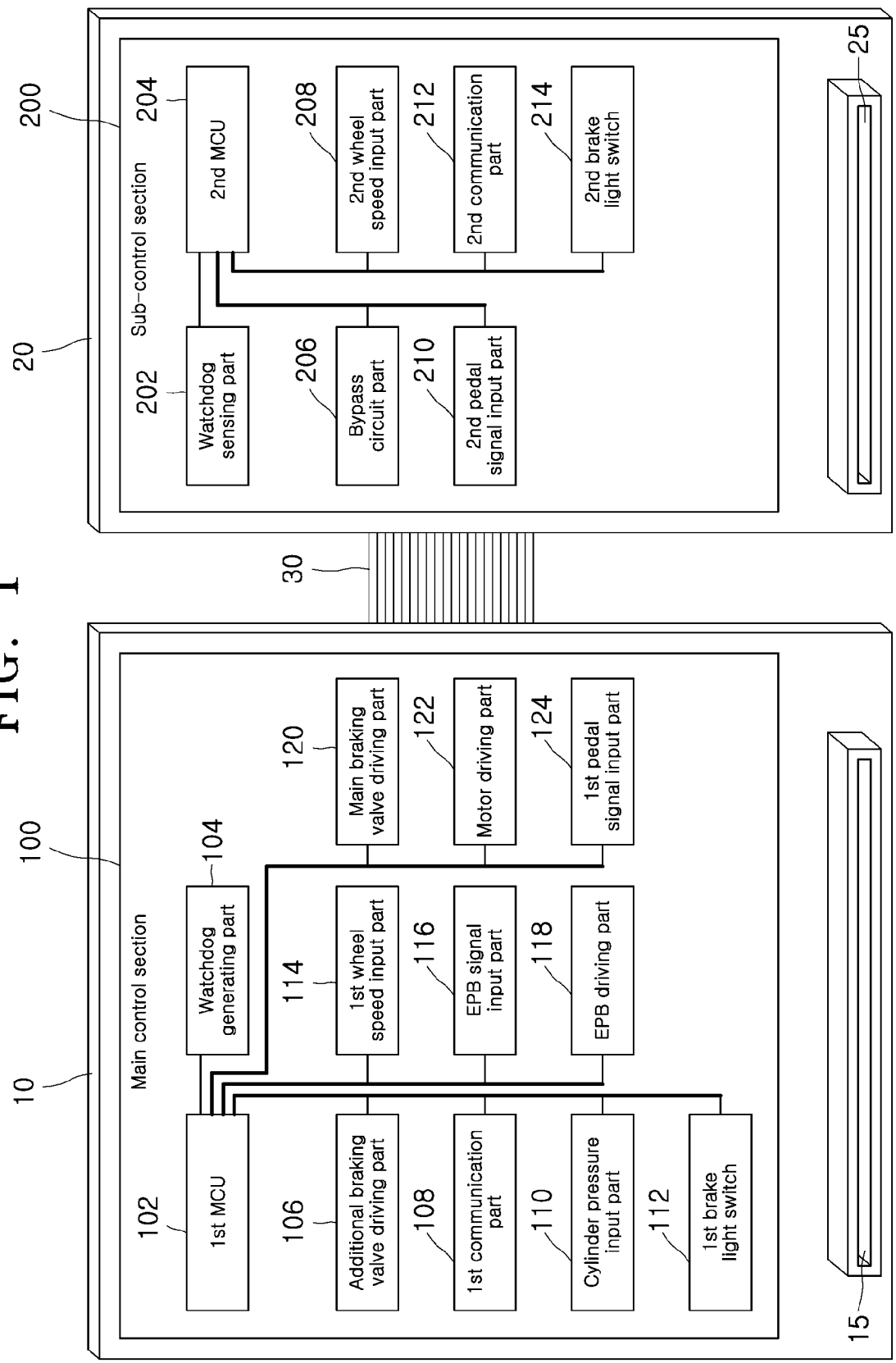
FIG. 1 is a block diagram illustrating an integrated electronic brake system according to an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an integrated electronic brake system and a control method thereof will be described below with reference to the accompanying drawings through various exemplary embodiments. In the description, the thickness of the lines or the size of the components illustrated in the drawings may be exaggerated for clarity and convenience of explanation. In addition, the terms to be described later are terms defined in consideration of functions in the present disclosure, which may vary according to the user or operator's intention or practices in the art. Therefore, definitions of these terms should be made based on the content throughout this specification.

Figure 2:
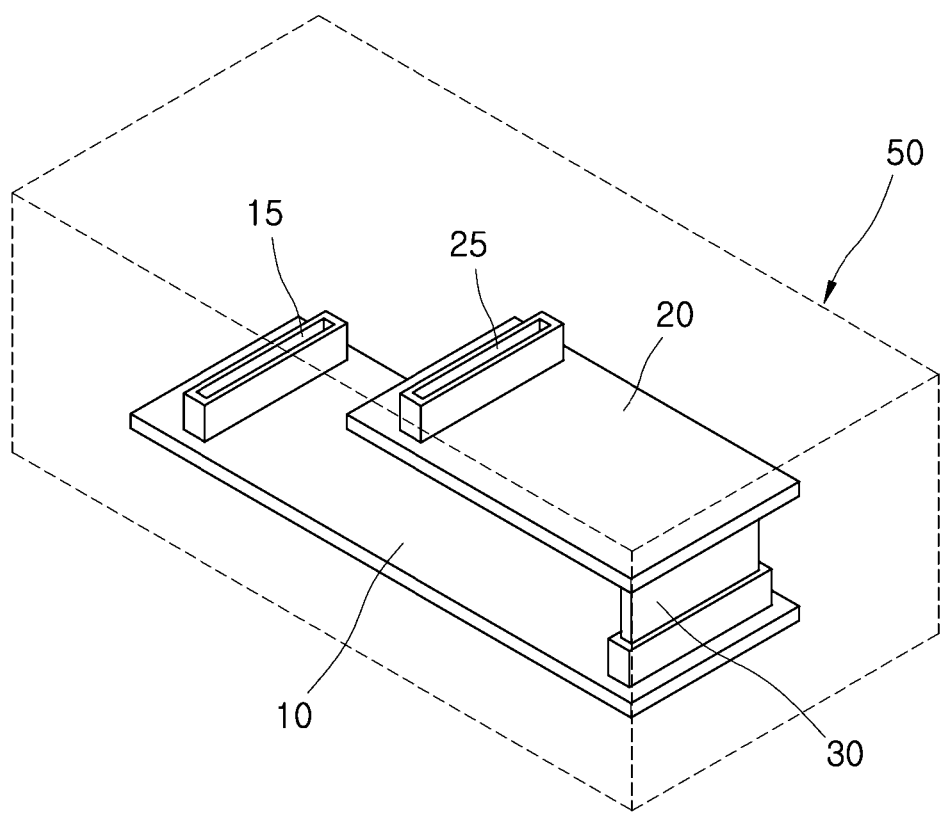
FIG. 2 is an exemplary diagram illustrating a structure of a control module of the integrated electronic brake system according to an embodiment of the present disclosure.

FIG. 1 is a block diagram illustrating an integrated electronic brake system according to an embodiment of the present disclosure, and FIG. 2 is an exemplary diagram illustrating a structure of a control module of the integrated electronic brake system according to an embodiment of the present disclosure.

As illustrated in FIGS. 1 and 2, the integrated electronic brake system according to an embodiment of the present disclosure may include a main control section 100, a sub-control section 200, and a connection bus 30.

The main control section 100 is configured in a first area 10 to receive any one or more of a value from a pedal sensor, a value from a cylinder pressure sensor, a value from a wheel speed sensor, or an electronic parking brake (EPB) signal: to perform the EPB control; to drive a main braking valve and a braking motor for the main braking operation of a vehicle depending on the manipulation of a pedal; to drive an additional braking valve for the additional braking operation of a vehicle; and to generate a watchdog signal.

The sub-control section 200 is configured in a second area 20 to, when a driving signal is input, receive any one or more of values of a pedal sensor and a wheel speed sensor, or an EPB signal to perform the EPB control and to drive the main braking valve and the braking motor for the main braking operation of a vehicle depending on the manipulation of a pedal through a bypass circuit.

Here, the driving signal may include any one or more of a watchdog signal, a fail signal of the main control section, or a user selection signal.

The connection bus 30 may connect the first area 10 and the second area 20 mounted in one box 50 to transfer a signal therebetween through General Purpose Input Output (GPIO) or Universal Asynchronous Receiver Transmitter (UART) between the main control section 100 and the sub-control section 200.

Here, as illustrated in FIG. 2, the connection bus 30 may connect the first area 10 and the second area 20 configured on independent PCBs so as to be arranged in multiple layers, in the form of a connector. Alternatively, the connection bus 30 may connect the first area 10 and the second area 20 separately formed on a single-layered PCB, through a pattern.

That is, in the control module of the integrated electronic brake system according to the present embodiment, as illustrated in FIG. 2, the first area 10 in which the main control section 100 is mounted and the second area 20 in which the sub-control section 200 is mounted may be provided in one box 50 so that they are connected through the connection bus 30, and they are connected to a peripheral device through a wire harness connected to a first connector 15 and a second connector 25.

In addition, when the main control section 100 and the sub-control section 200 are respectively configured in the first region 10 and the second region 20 on the single-layer PCB, the main control section and the sub-control section may be connected to a peripheral device through any one of the first connector 15 and the second connector 25, and data and power may be separately supplied through the connection bus 30.

Here, the main control section 100 and the sub-control section 200 may determine the validity of a pedal signal input from the main control unit 100 and a pedal signal input from the sub-control unit 200, respectively.

That is, the main control section 100 and the sub-control section 200 may receive a pedal stroke value by a first channel output and a pedal stroke value by a second channel output of the pedal sensor to determine the validity of the pedal signal.

In this case, the main control unit 100 and the sub-control unit 200 may respectively receive the pedal stroke value by the first channel output of the pedal sensor and the pedal stroke value by the second channel output of the pedal sensor, or alternatively, the main control unit 100 and the sub-control unit 200 may receive both the pedal stroke value by the first channel output and the pedal stroke value by the second channel output.

In the present embodiment, a case in which the main control section 100 receives the pedal stroke value by the first channel output and the sub-control unit 200 receives the pedal stroke value by the second channel output will be described as an example.

More specifically, the main control unit 100 may include a first pedal signal input part 124, a cylinder pressure input part 110, a first wheel speed input part 114, an EPB signal input part 116, an EPB driving part 118, a main braking valve driving part 120, an additional braking valve driving part 106, a motor driving part 122, a watchdog generating part 104, and a first micro control unit (MCU) 102.

The first pedal signal input part 124 may be configured to receive a pedal stroke value by the first channel output of a pedal sensor and transmit the received value to the first MCU 102. Accordingly, the first MCU 102 may determine the driver's braking state on the basis of the pedal stroke value and perform a braking control operation.

The cylinder pressure input part 110 may be configured to receive a master cylinder pressure value and a backup cylinder pressure value from a cylinder pressure sensor and transfer the received values to the first MCU 102.

The first wheel speed input part 114 may be configured to receive a wheel speed value from a wheel speed sensor, decode the wheel speed value in an ASIC chip, and transfer the decoded value to the first MCU 102, thereby receiving not only the vehicle speed but also the speed of each wheel.

The EPB signal input part 116 may be configured to receive an EPB signal for operating a parking brake and transfer the EPB signal to the first MCU 102.

The EPB driving part 118 may operate the parking brake.

The main control valve driving part 120 may be configured to drive a main braking valve for adjusting the hydraulic pressure of a master cylinder for the main braking operation of a vehicle according to the operation of a pedal.

The additional braking valve driving part 106 may be configured to drive an additional braking valve including an inlet valve and an outlet valve for controlling the hydraulic pressure supplied to a wheel cylinder to perform the additional braking operation according to the ABS or ESC function.

The motor driving part 122 may be configured to drive a braking motor for the main braking operation of a vehicle.

The watchdog generating part 104 may be configured to generate a watchdog signal in the event of the occurrence of a failure by counting whether or not an operation state is normal through communication with the first MCU 102.

The first MCU 102 may control the main control valve driving part 120, the additional braking valve driving part 106, the motor driving part 122, and the EPB driving part 118 according to a pedal stroke value, a pressure value, a wheel speed value, and an EPB signal input from at least one of the first pedal signal input part 124, the cylinder pressure input part 110, the first wheel speed input part 114, and the EPB signal input part 116.

A first communication part 108 may communicate with an in-vehicle peripheral control device through P-CAN or C-CAN. Accordingly, the first MCU 102 may perform the braking control operation by cooperative control in connection with the in-vehicle peripheral control device.

A first brake light switch 112 may operate a brake light according to a pedal stroke value by the first MCU 102.

In addition, the sub-control section 200 may include a second pedal signal input part 210, a second wheel speed input part 208, a bypass circuit part 206, a watchdog sensing part 202, and a second MCU 204.

The second pedal signal input part 210 may receive a pedal stroke value by the second channel output of a pedal sensor and transfer the pedal stroke value to the second MCU 204. Accordingly, the second MCU 204 may determine the driver's braking state on the basis of the pedal stroke value and perform a braking control operation.

The second wheel speed input part 208 may receive a wheel speed value from a wheel speed sensor, decode the wheel speed value in an ASIC chip, and transfer the decoded value to the second MCU 204, thereby receiving not only the vehicle speed but also the speed of each wheel.

The bypass circuit part 206 may switch a control path for the second MCU 204 to control the main control valve driving part 120 and the motor driving part 122 of the main control section 100.

At this time, the bypass circuit part 206 may switch the path so that the second MCU 204 can control the EPB driving part 118 according to the EPB signal, or otherwise may operate such that one wheel is EPB-controlled by the first MCU 102 and the other wheel is EPB-controlled by the second MCU 204.

The watchdog sensing part 202 senses a watchdog signal and transfers the watchdog signal to the second MCU 204, which makes it possible to determine a failure of the first MCU 102.

The second MCU 204 may control the main control valve driving part 120 and the motor driving part 122 for the main braking of a vehicle through the bypass circuit part 206 according to a pedal stroke value, a wheel speed value, and an EPB signal input from any one or more of the second pedal signal input part 210, the wheel speed input part 208, or the EPB signal input part 116 when any one or more driving signals among a watchdog signal for driving the sub-control section 200, a fail signal of the main control section, or a user selection signal are input.

Also, when the EPB signal is input, the second MCU 204 may control the EPB driving part 118 through the bypass circuit part 206 to perform the EPB control.

A second communication part 212 may communicate with an in-vehicle peripheral control device through P-CAN or C-CAN. Accordingly, the second MCU 204 may perform the braking control operation by cooperative control in connection with the in-vehicle peripheral control device.

A second brake light switch 214 may operate a brake light according to a pedal stroke value by the second MCU 204.

Here, as the first MCU 102 performs the main and additional braking control, whereas the second MCU 204 performs only the main braking control, the second MCU 204 may have a lower performance specification than that of the first MCU 102 of the main control section 100, which makes it possible to implement an economically saved feature.

As described above, in the integrated electronic brake system according to an embodiment of the present disclosure, the control module thereof is configured into the main control section and the sub-control section, which are connected via the internal connection bus, in two independent areas, respectively, in the single box such that in the event of a failure of the main control section, the main braking valve and the braking motor is controlled through the sub-control section, thereby reducing the size and weight of the electronic brake system as well as improving stability in implementing a small autonomous vehicle.

Figure 3:
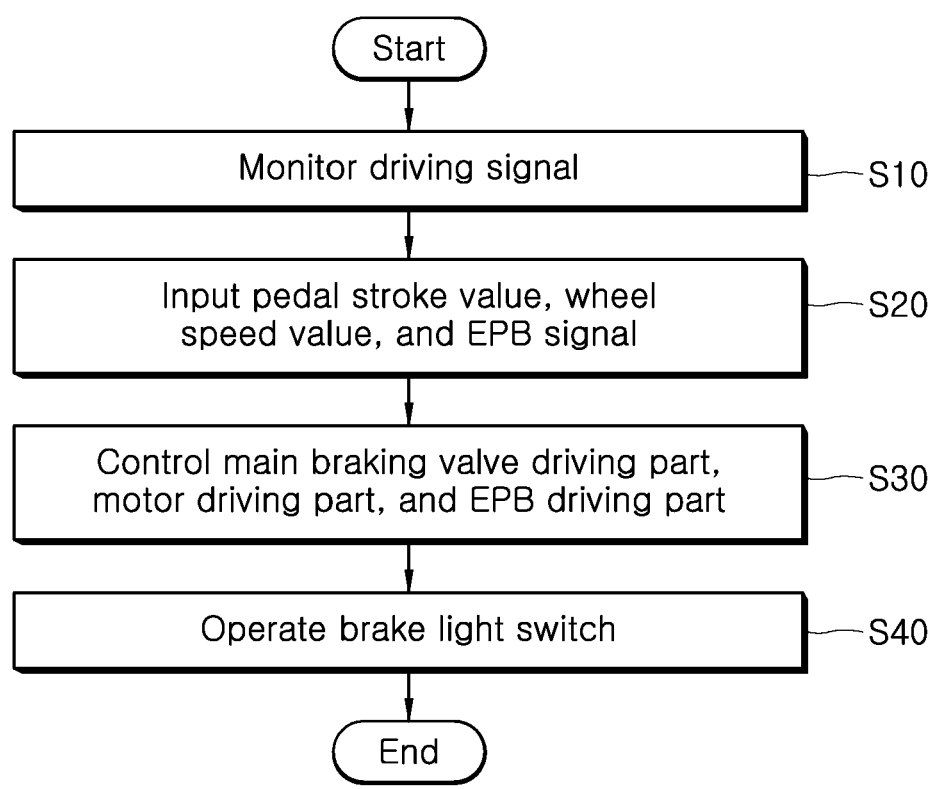
FIG. 3 is a flowchart illustrating a method of controlling the integrated electronic brake system according to an embodiment of the present disclosure.

FIG. 3 is a flowchart illustrating a method of controlling the integrated electronic brake system according to an embodiment of the present disclosure.

As illustrated in FIG. 3, in the control method of the integrated electronic brake system, first, the main control section 100 may receive any one or more of values of a pedal sensor, a cylinder pressure sensor, and a wheel speed sensor, or an EPB signal to perform the EPB control and drive a main braking valve and a braking motor for the main braking operation of a vehicle depending on the manipulation of a pedal, to drive an additional braking valve for the additional braking operation of a vehicle, and to generate a watchdog signal.

The control method of the integrated electronic brake system by the main control section 100 is a conventional control method, so a detailed description thereof will be omitted herein, and in this embodiment, the control method of the integrated electronic brake system by the sub-control section 200 will be described.

As described above, when an abnormality occurs in the first MCU 102 while the integrated electronic brake system is controlled with the normal operation of the main control section 100, a watchdog signal is generated.

On the other hand, the second MCU 204 monitors whether or not, as a driving signal for driving the sub-control section 200, a watchdog signal from the watchdog sensing part 202, a fail signal, or a user selection signal is input to the main control section 100 (S10).

In step S10, when it is monitored that the driving signal is input, the second MCU 204 receives a pedal stroke value, a wheel speed value, and an EPB signal from any one or more of a second pedal signal input part 210, a second wheel speed input part 208, or an EPB signal input part 116 (S20).

Here, the second MCU 204 may determine the validity of a pedal signal input from the second pedal signal input part 210 and a pedal signal input from the first pedal signal input part 124 of the main control section 100.

After receiving the pedal stroke value, the wheel speed value and the EPB signal in step S20, the second MCU 204 controls a main braking valve driving part 120, a motor driving part 122, and an EPB driving part 118 of the main control section 100 through a bypass circuit part 206 depending on the pedal stroke value, the wheel speed value, and EPB signal to perform the main braking control and the EPB control of a vehicle (S30).

Here, the second MCU 204 may perform the braking control by cooperative control in connection with an in-vehicle peripheral control device through a second communication part 212.

While the vehicle main braking is controlled in step S30, the second MCU 204 operates a brake light switch 214 to turn on a brake light (S40).

As described above, in the control method of the integrated electronic brake system according to an embodiment of the present disclosure, the control module is configured into the main control section and the sub-control section, which are connected via the internal connection bus, in two independent areas, respectively, in the single box such that in the event of a failure of the main control section, the main braking valve and the braking motor are controlled through the sub-control section, thereby reducing the size and weight of the electronic brake system as well as improving stability in implementing a small autonomous vehicle.

Implementations described herein may be implemented in a method or process, an apparatus, a software program, a data stream, or a signal, for example. Although discussed only in the context of a single form of implementation (e.g., discussed only as a method), implementations of the discussed features may also be implemented in other forms (e.g., an apparatus or program). The apparatus may be implemented in suitable hardware, software and firmware, and the like. The method may be implemented in an apparatus such as, for example, a processor, which generally refers to a processing device including a computer, a microprocessor, an integrated circuit or programmable logic device, and the like. Processors also include communication devices such as computers, cell phones, portable/personal digital assistants ("PDA") and other devices that facilitate communication of information between end-users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An integrated electronic brake system comprising:
   a main control section configured in a first area to receive any one or more of a value from a pedal sensor, a value from a cylinder pressure sensor, a value from a wheel speed sensor, or an electronic parking brake (EPB) signal, to perform EPB control, to drive a main braking valve and a braking motor for a main braking operation of a vehicle depending on manipulation of a pedal, and to drive an additional braking valve for an additional braking operation;
   a sub-control section configured in a second area to, when a driving signal is input, receive any one or more of the value from the pedal sensor, the value from the wheel speed sensor, or the EPB signal, to perform the EPB control, and to drive the main braking valve and the braking motor for the main braking operation of the vehicle depending on the manipulation of the pedal through a bypass circuit; and
   a connection bus configured to connect the first area and the second area, mounted in one box, and to transfer transmission/reception signals between the main control section and the sub-control section,
   wherein the sub-control section is configured to, in an event of a failure of the main control section, control the main braking valve and the braking motor for the main braking operation of the vehicle by switching a control path through the bypass circuit,
   wherein the main control section comprises:
   a first pedal signal input part configured to receive a pedal stroke value from the pedal sensor;
   a cylinder pressure input part configured to receive a cylinder pressure value from the cylinder pressure sensor;
   a first wheel speed input part configured to receive a wheel speed value from the wheel speed sensor and to decode the wheel speed value;
   an EPB signal input part configured to receive an EPB signal;
   an EPB driving part configured to drive a parking brake;
   a main braking valve driving part configured to drive the main braking valve for the main braking operation of the vehicle;
   an additional braking valve driving part configured to drive the additional braking valve for the additional braking operation of the vehicle;
   a motor driving part configured to drive the braking motor;
   a first micro control unit (MCU) configured to control the main braking valve driving part, the additional braking valve driving part, the motor driving part, and the EPB driving part depending on signals input from any one or more of the first pedal signal input part, the cylinder pressure input part, the first wheel speed input part, or the EPB signal input part,
   wherein the sub-control section comprises:
   a second pedal signal input part configured to receive a pedal stroke value from the pedal sensor;
   a second wheel speed input part configured to receive a wheel speed value from the wheel speed sensor and to decode the wheel speed value;
   a bypass circuit part configured to switch a control path to control the main braking valve driving part and the motor driving part of the main control section;
   a second micro control unit (MCU) configured to control the main braking valve driving part, the motor driving part, and the EPB driving part depending on signals input from any one or more of the second pedal signal input part, the second wheel speed input part, and the EPB signal input part, and
   wherein the second MCU has a lower performance specification than the first MCU of the main control section such that the first MCU performs the main braking operation and the additional braking operation while the second MCU performing only the main braking operation and not performing the additional braking operation.

2. The integrated electronic brake system of claim 1, wherein the driving signal comprises any one or more of a watchdog signal, a failure signal of the main control section, or a user selection signal.

3. The integrated electronic brake system of claim 1, further comprising: a first connector mounted on the first area and connecting the main control section and a peripheral device; and
   a second connector mounted on the second area and connecting the sub-control section and a peripheral device.

4. The integrated electronic brake system of claim 1, wherein the main control section further comprises:
   a watchdog generating part configured to generate a watchdog signal.

5. The integrated electronic brake system of claim 4, wherein the additional braking valve includes an inlet valve and an outlet valve and is configured to control hydraulic pressure supplied to wheel cylinders for driving an anti-lock brake system (ABS) and an electronic stability control (ESC).

6. The integrated electronic brake system of claim 4, wherein the main control section further comprises a first communication part configured to communicate with a peripheral control device through in-vehicle communication.

7. The integrated electronic brake system of claim 4, wherein the main control section further comprises a first brake light switch configured to operate a brake light.

8. The integrated electronic brake system of claim 4, wherein the sub-control section further comprises:
a watchdog sensing part configured to sense a watchdog signal.

9. The integrated electronic brake system of claim 8, wherein the sub-control section further comprises a second communication part configured to communicate with a peripheral control device through in-vehicle communication.

10. The integrated electronic brake system of claim 8, wherein the sub-control section further comprises a second brake light switch configured to operate a brake light.

11. The integrated electronic brake system of claim 1, wherein the main control section and the sub-control section are configured to determine validities of a pedal signal input from the main control section and a pedal signal input from the sub-control section, respectively.

12. The integrated electronic brake system of claim 1, wherein the sub-control section is further configured to, in a normal situation where a failure of the main control section is not detected, not control the main braking valve and the braking motor for the main braking operation of the vehicle.

13. A method of controlling an integrated electronic brake system comprising a main control section configured in a first area, a sub-control section configured in a second area, and a connection bus configured to connect the first area and the second area for transferring transmission/reception signals between the main control section and the sub-control section, the main control section comprising: a first pedal signal input part configured to receive a pedal stroke value from a pedal sensor; a cylinder pressure input part configured to receive a cylinder pressure value from a cylinder pressure sensor; a first wheel speed input part configured to receive a wheel speed value from a wheel speed sensor and to decode the wheel speed value; an electronic parking brake (EPB) signal input part configured to receive an EPB signal; an EPB driving part configured to drive a parking brake; a main braking valve driving part configured to drive a main braking valve for a main braking operation of a vehicle; an additional braking valve driving part configured to drive an additional braking valve for an additional braking operation of the vehicle; a motor driving part configured to drive a braking motor; a first micro control unit (MCU) configured to control the main braking valve driving part, the additional braking valve driving part, the motor driving part, and the EPB driving part depending on signals input from any one or more of the first pedal signal input part, the cylinder pressure input part, the first wheel speed input part, or the EPB signal input part, the sub-control section comprising: a second pedal signal input part configured to receive a pedal stroke value from the pedal sensor; a second wheel speed input part configured to receive a wheel speed value from the wheel speed sensor and to decode the wheel speed value; a bypass circuit part configured to switch the control path to control the main braking valve driving part and the motor driving part of the main control section; a second micro control unit (MCU) configured to control the main braking valve driving part, the motor driving part, and the EPB driving part depending on signals input from any one or more of the second pedal signal input part, the second wheel speed input part, and the EPB signal input part, the method comprising:

receiving, by the first MCU, any one or more of a pedal stroke value from the first pedal signal input part, a value from the cylinder pressure sensor, a wheel speed value from the wheel speed sensor, or an EPB signal, performing EPB control, driving the main braking valve and the braking motor for the main braking operation of the vehicle depending on manipulation of a pedal, and driving the additional braking valve for the additional braking operation;

monitoring, by the second MCU, an input of a driving signal for driving the sub-control section;

when the input of the driving signal has been checked, receiving, by the second MCU, any one or more of a pedal stroke value from the second pedal signal input part of the sub-control section, a wheel speed value from the second wheel speed input part of the sub-control section, or an EPB signal from the EPB signal input part; and controlling, by the second MCU, the main braking valve driving part, the motor driving part, and the EPB driving part of the main control section through the bypass circuit part of the sub-control section depending on the one or more of the pedal stroke value, the wheel speed value, or the EPB signal, wherein:

in an event of a failure of the main control section, the second MCU of the sub-control section controls the main braking valve driving part and the motor driving part to drive a main braking valve and a braking motor for the main braking operation of the vehicle by switching a control path through the bypass circuit part of the sub-control section, the second MCU has a lower performance specification than the first MCU of the main control section such that the first MCU performs the main braking operation and the additional braking operation while the second MCU performing only the main braking operation and not performing the additional braking operation.

14. The method of claim 13, wherein the driving signal comprises any one or more of a watchdog signal, a failure signal of the main control section, or a user selection signal.

15. The method of claim 13, wherein the controlling a main braking valve driving part, a motor driving part, and an EPB driving part of a main control section comprises:
performing, by the second MCU, a braking control by cooperative control in connection with an in-vehicle peripheral control device through a communication part of the sub-control section.

16. The method of claim 13, wherein the controlling a main braking valve driving part, a motor driving part, and an EPB driving part of a main control section comprises:
operating, by the second MCU, a brake light switch.

17. The method of claim 13, further comprising: determining, by the second MCU, a validity of a pedal signal input from the pedal signal input part of the sub-control section and a validity of a pedal signal input from a pedal signal input part of the main control section.

18. The method of claim 13, wherein, in a normal situation where a failure of the main control section is not detected, the second MCU of the sub-control section does not control the main braking valve and the braking motor for the main braking operation of the vehicle.

* * * * *